United States Patent

Macke et al.

Patent Number: 5,449,052
Date of Patent: Sep. 12, 1995

[54] ADJUSTING MECHANISM FOR A DISC BRAKE

[75] Inventors: Wlodzimierz Macke, Viernheim; Bernd Rupprecht, Edingen-Neckarhausen, both of Germany

[73] Assignee: Perrot Bremsen GmbH, Mannheim, Germany

[21] Appl. No.: 271,467

[22] Filed: Jul. 7, 1994

[30] Foreign Application Priority Data

Jul. 12, 1993 [DE] Germany .................. 43 23 292.2

[51] Int. Cl.⁶ ............................................. F16D 65/52
[52] U.S. Cl. ................................... 188/71.9; 188/72.7
[58] Field of Search ............... 188/71.8, 71.9, 72.6, 188/72.7, 196 D, 196 P, 196 V, 106 F; 192/70.23, 70.25, 111 A, 111 B

[56] References Cited

U.S. PATENT DOCUMENTS

| | | | |
|---|---|---|---|
| 3,770,082 | 11/1973 | Brooks et al. | 188/71.9 |
| 4,355,708 | 10/1982 | Papagni | 188/71.9 |
| 4,598,800 | 7/1986 | Marianu | 188/196 D |
| 4,819,768 | 4/1989 | Czich et al. | 188/196 D |
| 5,123,505 | 6/1992 | Antony | 188/196 D |

FOREIGN PATENT DOCUMENTS

| | | | |
|---|---|---|---|
| 0478917 | 4/1992 | European Pat. Off. | 188/71.7 |
| 2168439 | 6/1986 | United Kingdom | 188/71.9 |

*Primary Examiner*—Robert J. Oberleitner
*Assistant Examiner*—Chris Schwartz
*Attorney, Agent, or Firm*—Jacobson, Price, Holman & Stern

[57] ABSTRACT

An adjusting mechanism for a disc brake, particularly a sliding-caliper disc brake. The adjusting mechanism comprising a force-dependent coupling disposed on the side of the adjusting drive mechanism which side is directed toward the brake disc. In particular, the force-dependent coupling is disposed between an application shaft and an adjusting shaft. A part of the coupling is fixed to the adjusting shaft, both rotationally and axially, axially at least so as not to be slidable in the direction away from the brake disc. The remainder of the adjusting drive mechanism is axially slidable in the direction away from the brake disc against an elastic restoring force.

15 Claims, 4 Drawing Sheets

ADJUSTING MECHANISM FOR A DISC BRAKE

BACKGROUND OF THE INVENTION

The invention relates to an adjusting mechanism for a disc brake, particularly a sliding-caliper disc brake.

Ordinarily, adjusting mechanisms for sliding-caliper disc brakes have at least one adjusting shaft for rotating a thrust spindle, which spindle rests against a brake head and is screwed into a thrust piece which can be subjected to force by forcefully rotating an application shaft so as to produce a compression in the direction toward a brake disc, as well as an adjusting drive mechanism between the application shaft and the adjusting shaft, which adjusting drive mechanism has a force-dependent coupling.

For installation or removal of the brake pads, or for other reasons such as repair, replacement, or the like, of individual elements, the brake is returned to its initial position. For this purpose, the thrust spindle is screwed into the thrust piece so as to move the brake head axially away from the brake disc. The thrust spindle is moved (along its longitudinal axis) away from the brake disc, as well. In this process it is possible that the thrust spindle can abut against the adjusting drive mechanism, which drive may then experience canting and jamming. When jammed, the drive mechanism cannot perform its adjusting function during the next braking process.

SUMMARY OF THE INVENTION

The underlying problem addressed by the present invention is to devise an adjusting mechanism which reliably prevents canting or jamming of the adjusting drive mechanism when the thrust spindle is screwed into the thrust piece. According to the invention, the problem is solved by providing an adjusting mechanism for a disc brake, particularly a sliding-caliper disc brake, which adjusting mechanism has at least one adjusting shaft for rotating a thrust spindle which spindle rests against a brake head and is screwed into a thrust piece which can be subjected to force by forcefully rotating an application shaft so as to produce a compression in the direction toward a brake disc, and an adjusting drive mechanism between the application shaft and the adjusting shaft, which adjusting drive mechanism has a force-dependent coupling. The force-dependent coupling is disposed on the side of the adjusting drive mechanism which is directed toward the thrust spindle. A part of the force-dependent coupling is fixed to the adjusting shaft, both rotationally and axially (axially at least so as not to be slidable in the direction away from the thrust spindle), and the remainder of the adjusting drive mechanism is axially slidable in the direction away from the thrust spindle, against an elastic restoring force.

The above-described configuration of an adjusting mechanism ensures the functioning of the adjusting mechanism even when the thrust spindle rests against the adjusting mechanism. Because of the disposition of the force-dependent coupling of the side of the adjusting drive mechanism directed toward the thrust spindle, if the thrust spindle is excessively screwed back into the thrust piece, the thrust spindle comes to abut against the said coupling, specifically against that part of the coupling which is rotationally and axially fixed to the adjusting shaft. That is, it comes to abut against that part of the coupling which rotates directly together with the thrust spindle when the screwing out of the thrust spindle occurs, and thus, in this position, it is not possible for any jamming or canting to occur. When the thrust spindle abuts against the adjusting drive mechanism, the latter can still yield axially away from the thrust spindle, against an elastic restoring means. Therefore, on the side of the adjusting drive mechanism directed away from the thrust spindle, there is no hazard of jamming or canting. Instead, a person who brings the brake back to its initial position by rotating the thrust spindle will know when said initial position is reached, because the spring force will be evident when the thrust spindle comes to abut against the force-dependent coupling of the adjusting drive mechanism. The spring force will be detected by the substantially increased force required to further rotate the thrust spindle. If the thrust spindle does happen to be rotated slightly beyond the abutting point against the adjusting drive mechanism, damage does not occur because the other parts of the adjusting drive mechanism are movable in the direction away from the thrust spindle.

The force-dependent coupling is preferably a toothed locking mechanism which overruns (jump slips) when, during retraction of the brake, a torque is applied to the thrust spindle which exceeds the force moment derived from the compressive spring pre-stressing. Under these circumstances, the remainder of the drive mechanism can be slid axially away from the thrust spindle by a distance at least equal to that required for the overrunning of the teeth of the toothed coupling. As an alternative, to the toothed locking mechanism, the force-dependent coupling may be formed from a spring-loaded frictional locking mechanism.

Preferably, the adjusting drive mechanism is disposed on the side of the application shaft which is directed away from the brake disc. In this way the adjusting drive mechanism will not be disposed inside the region of the primary brake mechanism which would complicate assembly and disassembly. In addition, the adjusting drive mechanism will not be disposed in the region of the force transmission of the brake application process, which is a benefit to the service life of the individual parts of the adjusting drive mechanism and to the reliability and functioning of the adjustment mechanism.

According to the invention, means may be provided to maintain a free space for the axial sliding of the abovementioned other parts of the adjusting drive mechanism. Such a means of maintaining a free space is particularly desirable if the region into which the said other parts are to retract against the elastic restoring force is not completely open but, e.g., is closed off by a cover or the like. This means for maintaining the free space may comprise at least two retaining rings. Alternatively, the means for maintaining the free space may be a spacing bushing.

In addition, it is preferred according to the invention that the free play of the brake is inherently provided by the device which provides the coupling of the adjusting drive mechanism with the application shaft (and/or with the thrust spindle). Toward this end, the coupling may have a pin-and-slot connection, wherein the pin engages the slot with a play which corresponds to the brake play.

A further advantage of the disposition of the adjusting drive mechanism on the side of the application shaft directed away from the brake disc, in addition to the advantages mentioned above, is that the entire adjusting mechanism (with the exception of the thrust spindle) can be mounted on a portion of the caliper housing prior to the overall assembly and installation of the brake. Consequently, the adjusting mechanism can be tested prior to the assembly. The caliper housing portion bearing the adjusting mechanism can be subsequently affixed to the other part of the caliper housing which accommodates the application device. This feature is particularly desirable when automatic means are to be used to assemble and install the brake.

To further facilitate the installation of the inventive adjusting mechanism, where a pin-and-slot connection is used, the slot can be open in the direction generally toward the side of the application shaft, which side is directed away from the brake disc. In this way, the pin-and-slot connection can be assembled by a simple translation of the two parts.

The invention will be described further hereinbelow with reference to the preferred embodiments and the accompanying drawings, with additional features described in some detail.

DESCRIPTION OF THE PREFERRED EMBODIMENT

Figure 1:
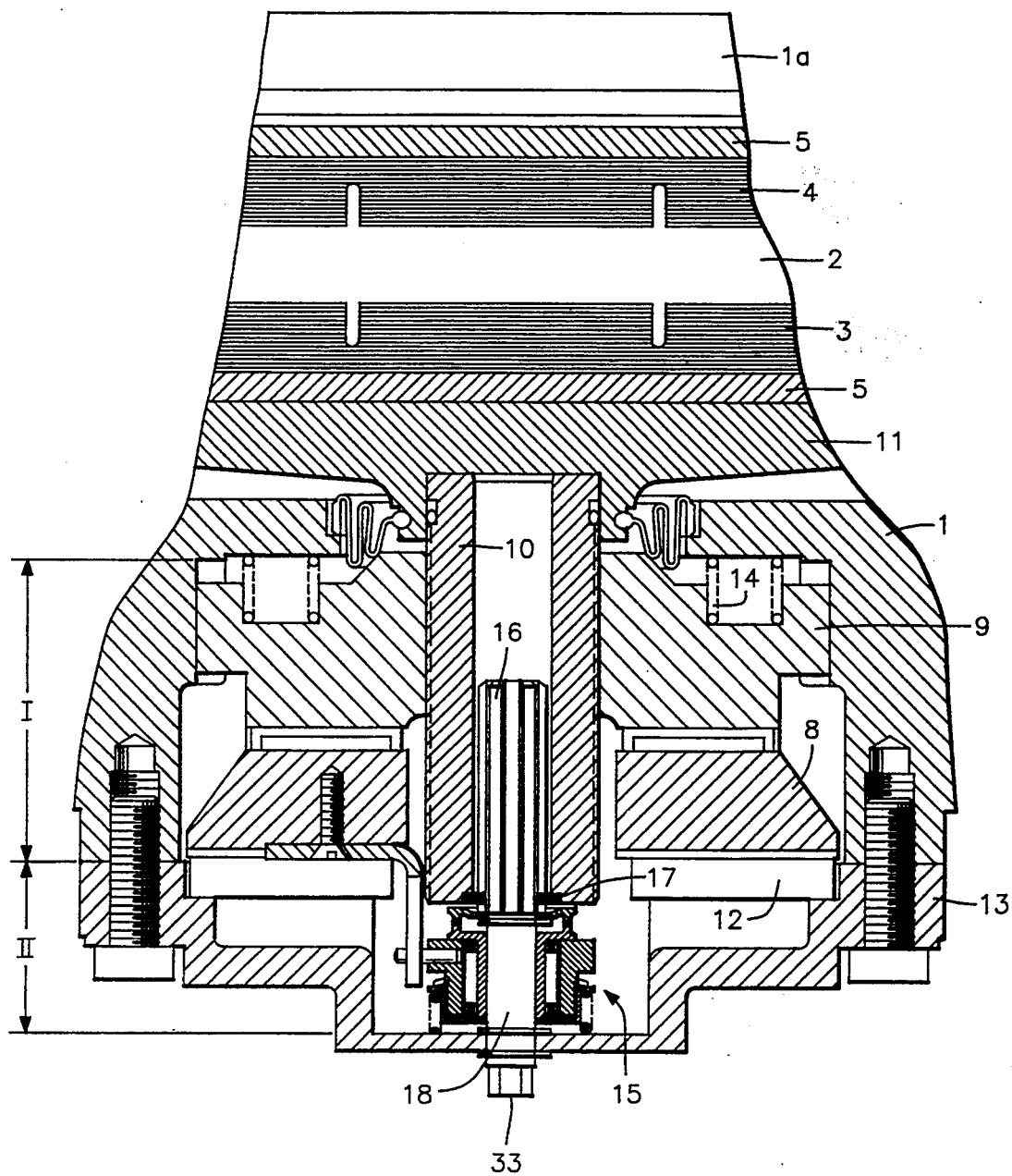
FIG. 1 is a cross section through a sliding-caliper disc brake having the inventive adjusting mechanism.
Figure 2:
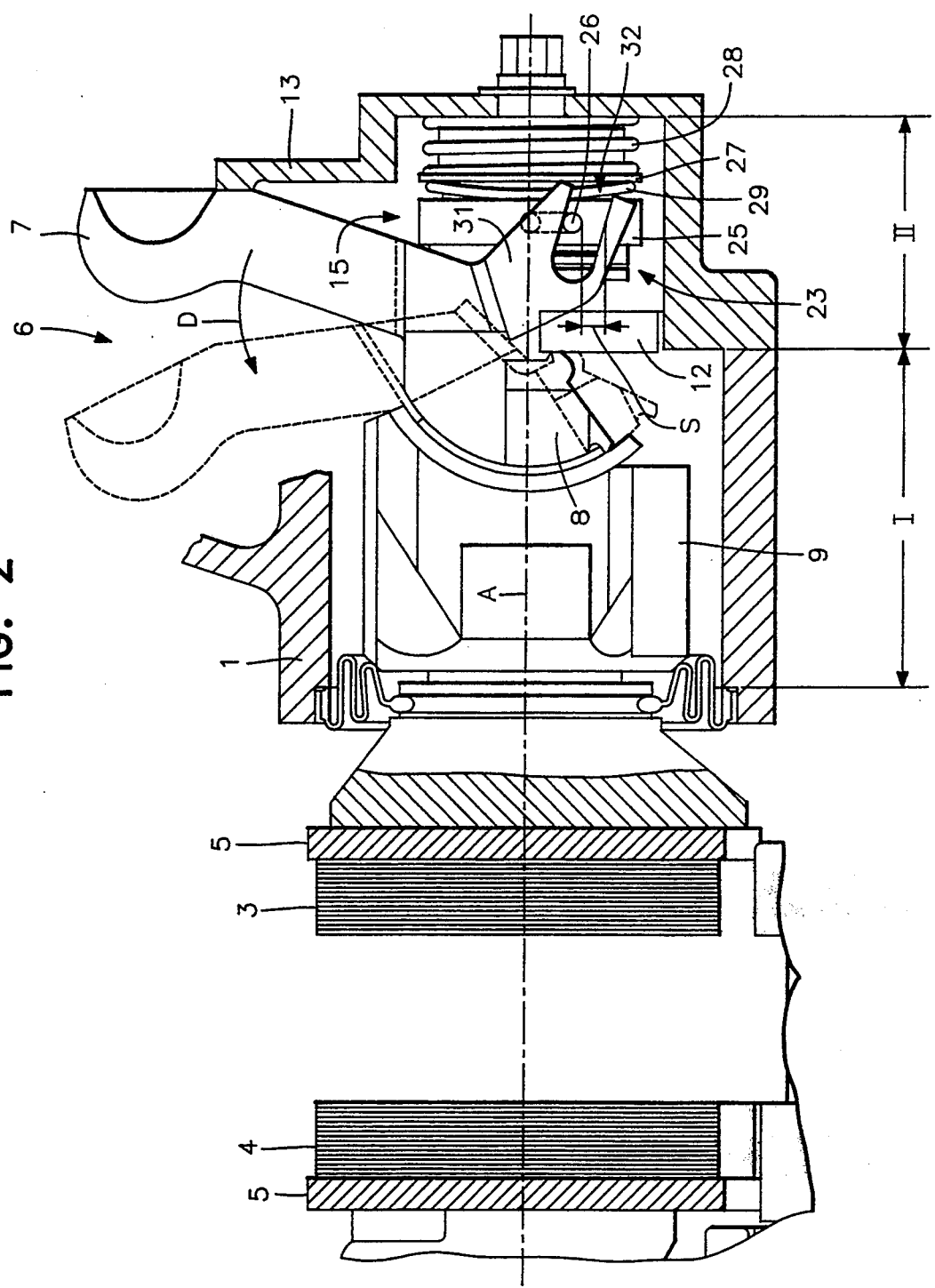
FIG. 2 is a cross section through the sliding-caliper disc brake, perpendicular to the cross section of FIG. 1.

With reference to FIGS. 1 and 2, the disc brake illustrated has a brake caliper 1a which extends over a brake disc 2 with both legs of said caliper, in the usual fashion. Brake pads 3, 4 disposed on brake pad supports 5 on both sides of the brake disc are guided and supported in a brake bracket (not shown) or in the housing 1 of the caliper. The caliper 1a is mounted so as to be slidable in the direction perpendicular to the disc, with the aid of guide means (not shown in detail). The caliper 1a has an application mechanism 6 on one side for applying the brake.

The application mechanism 6 is comprised essentially of a brake lever 7 which is connected to an application shaft 8 disposed parallel to the plane of the brake disc, a thrust piece 9 which can be slid within the caliper housing 1, and a thrust spindle 10 screwed into the center of the thrust piece 9 in the plane of the brake axis A of the application device 6. In the part of the thrust spindle 10 closest to the disc 2, a thrust head 11 is coupled to the spindle 10, which thrust head abuts against the lining or pad support 5.

The application shaft 8 rests against support plates 12 within the caliper housing. The caliper housing 1 is closed off by a cover 13. The contour of the support structure whereby the application shaft 8 is supported against the support plates 12 is the subject of German patent application P 43 07 019.1 which has not yet been laid open. A corresponding U.S. application to this German application has been filed on Mar. 7, 1994, and assigned U.S. Ser. No. 08/206,672. The application mechanism device, or device 6 is urged in the direction of the support plates 12 by compression springs 14. The thrust piece 9 may be guided in the brake caliper housing.

As a result of this arrangement, it is possible to divide the interior space of the brake caliper housing into two regions, I and II, wherein region I is an application region lying on the side of the support plates 12 directed toward the brake disc, and serves to accommodate the application mechanism. Region II is a free region which serves solely to accommodate an adjusting drive mechanism 15 for the thrust spindle 10.

Figure 4:
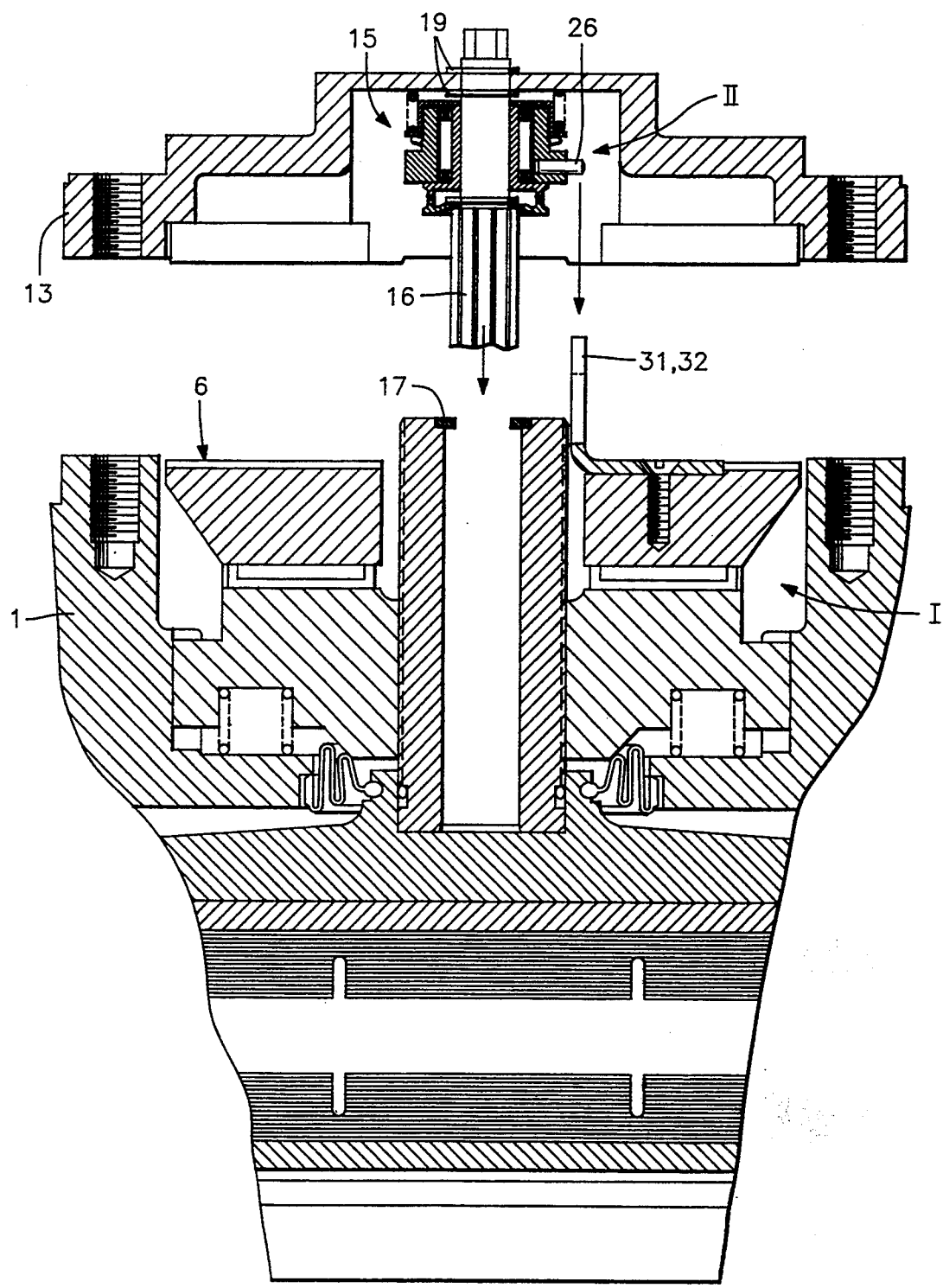
FIG. 4 is a cross section similar to FIG. 1, but during the time when the brake is being assembled.

As shown in particular in FIG. 4, the entire adjusting drive mechanism 15 (described in detail below) can be pre-mounted on the cover 13 within the free region II. In this way, the operation of the adjusting drive mechanism 15 can be tested prior to being mounted on the caliper housing. Further, the mechanism 15 can be affixed to the caliper housing 1 as a unit along with the cover 13.

Figure 3:
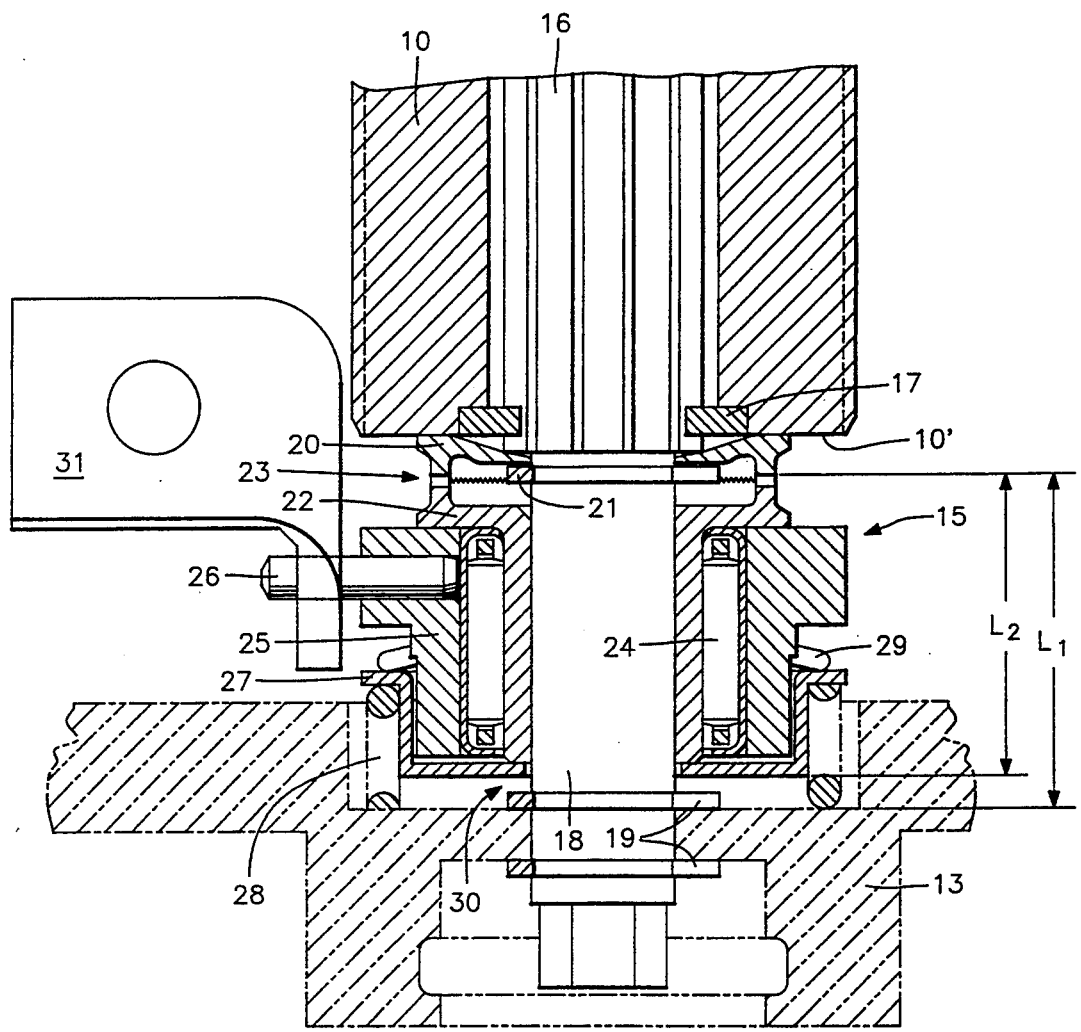
FIG. 3 is an enlarged cross section of the inventive adjusting mechanism, in the initial state.

The adjusting drive mechanism 15, shown in greater detail in FIG. 3, has an adjusting shaft 16 in the form of a profiled shaft which rotatably operatively engages the thrust spindle 10 via profiled discs 17 but is axially slidable with respect to spindle 10. The shaft 16 has a cylindrical extension 18.

The extension 18 is rotatably held in a corresponding opening of the cover 13 by means of two retaining rings 19 or the like. The other adjusting pans are disposed in a superposed configuration ("parallel coupled") inside the brake housing, over the extension 18. This configuration saves space.

A retaining ring 21 on the extension 18 holds a ring 20 which has teeth on its end face. The ring 20 is held rigidly—both rotationally rigidly and axially non-slidably—to the profiled shaft 16. The distance L1 between the rigidly held ring 20 and the cover 13 is greater than the axial assembled length L2 of the other parts of the adjusting drive mechanism 15. As a result, a free space 30 is formed. The distance L1 can also be defined by a spacing sleeve, in which case one may dispense with the retaining ring 21 and one of the retaining rings 19.

A bushing 22 is mounted on the extension 18. The bushing 22 has teeth on its end face, opposite the teeth on the end face of the ring 20, thereby forming a toothed locking mechanism 23 which serves as a force-dependent coupling. The toothed locking mechanism 23 may alternatively be formed by a frictional locking mechanism which transmits torque. The bushing 22 is coupled to a sleeve 25 by means of a one-way coupling 24 (e.g. a ratchet sleeve coupling, wrap spring clutch, or the like). Sleeve 25 in turn has an engaging pin 26 or the like.

A spring-loaded cap 27 rests axially against the bushing 22. A compression spring 28 is mounted between the cap 27 and the cover 13. Because the axial length of the bushing 22 is greater than the axial length of the sleeve 25, the pre-stressing force of the spring 28 does not act on the sleeve 25 but only exerts the required pre-stressing force on the toothed locking mechanism 23. The compression spring can only exert a holding force on the adjusting shaft 16, ring 20, and bushing 22; wherein during the process of releasing the brake there is no retracing of any adjusting excursion which has been effected.

In order to avoid changing of the basic free play S (FIG. 2) by vibrations of the brake in the unstressed state, a spring ring 29 or the like is provided between the spring-loaded cap 27 and the sleeve 25. In this way, the setting of the sleeve 25 is retained despite vibrations. The holding force of the spring ring 29 is less than the pre-stressing force of the compression spring 28, for reasons which will be apparent in the description of the operation of the device, below.

The free space 30 between the spring-loaded cap 27 and the cover 13 is such that the distance L1 between the ring 20 and the cover 13 is greater than the axial assembled length L2 of the other parts of the adjusting drive mechanism 15. The free space 30 allows the adjusting drive mechanism 15 to be moved back axially in the event the opposing teeth of the toothed locking mechanism 23 slidingly jump over each other in overrunning fashion.

In order to provide an operative connection between the application device 6 and the adjusting drive mechanism 15, a projecting lever member 31 is affixed to the brake lever 7 or the application shaft 8, which member 31 executes a swinging movement when the brake is applied with the application device 6. The lever member 31 has an open slot 32 directed generally toward the cover 13. The engaging pin 26 for rotating the adjusting drive mechanism 15 engages this slot.

In the exemplary embodiment illustrated, the desirable free play S of the brake is provided for via a detent play between the slot 32 and the engaging pin 26. However, other configurations are conceivable for realizing the brake play S. Because the slot opening 32 is directed toward the cover 13, it is possible to slide the engaging pin 26 into the slot and couple it to the lever member 31 when the cover 13 and the adjusting drive mechanism 15 are together attached to the brake caliper housing 1 (see FIG. 4).

The operation of the brake mechanism is as follows. When the application device is actuated (arrow D, FIG. 2), the lever member 31 is swung along with the brake lever 7 and, after the free play S is taken up on account of wear of the brake pad or brake discs, the member 31 engages the engaging pin 26. This causes rotation of the sleeve 25, and, in turn, rotation of the bushing 22 by means of the one-way coupling 24 which coupling locks in the rotation direction D. This rotation of the bushing 22 is transmitted to the ring 20 via the spring-loaded toothed locking mechanism 23, and to the adjusting shaft 16 which is attached to ring 20, so that the thrust spindle 10 is screwed out of the thrust piece 9 by means of the profiled disc member 17, to effect an adjustment.

When the brake pad is applied and elastic brake deformation occurs, accompanied by continued advance of the application device in the direction D, if the thread friction between the thrust piece 9 and the thrust spindle 10 exceeds the adjusting torque which can be transmitted by the spring-loaded toothed locking mechanism 23, the teeth suffer overrunning. This causes all of the adjusting parts other than the axially non-slidable ring 20 to move axially against the pre-stressing compression force of the compression spring 28 in the direction toward the free space 30. The part of the application excursion which is undergone under braced stressing is thus excluded in the adjusting process.

The one-way coupling 24 does not engage in the brake-release direction, wherein (during brake release) until the engaging pin 26 engages the other side of the slot 32 the compression spring 28 exerts the necessary holding torque on the bushing 22, the ring 20, and the adjusting shaft 16 (in consequence of the axial play between the bushing 22 and the sleeve 25)—and the lever member 31, via engaging pin 26, merely rotates the sleeve 25 to its (the sleeve's) initial position. During this movement all of the other parts of the adjusting mechanism remain unengaged (by the sleeve 25).

There is a hazard that when the brake is in a released state the sleeve 25 and pin 26 can be moved out of their rest position due to vibrations or the like, which would lead to a spurious defeat of the free play S. To prevent this, the required holding torque is exerted on the sleeve 25 by the spring ring 29 or equivalent means. As mentioned above, to suitably accomplish this purpose, the force of the spring ring 29 is less than that of the compression spring 28. This condition must also be fulfilled during the brake release process, in order to avoid undesired reverse movement of the adjusting shaft 16, the ring 20, and the bushing 22.

When the brake is retracted, e.g. to change a brake pad, the adjusting shaft 16 is rotated by a tool, via a tool-engaging projection 33, whereby the thrust spindle 10 is returned to its initial position. In this process, the fixed ring 20 serves as a "stop piece" for the thrust spindle, which prevents pressing of the adjusting piece against the cover 13 which is attached to the caliper housing. In this way it is assured that in the subsequent brake application process, the adjusting can be easily effected and the axial yielding during de-coupling (i.e. overrunning of the toothed coupling 23) can occur.

We claim:

1. An adjusting mechanism for a disc brake, particularly a sliding caliper disc brake having a brake disc oriented in a particular plane, including a thrust spindle which rests against a brake head, a thrust piece into which the thrust spindle is screwed, and an application shaft which is rotatable about an axis parallel to the plane of the brake disc for subjecting said thrust piece to a force so as to produce a compression in a direction toward a brake disc, the adjusting mechanism comprising at least one adjusting shaft for rotating said thrust spindle, and an adjusting drive mechanism connected in series between the application shaft and the adjusting shaft, which adjusting drive mechanism has a force-dependent coupling, wherein said force-dependent coupling is disposed on the side of the adjusting drive mechanism which is directed toward the thrust spindle, a part of the force-dependent coupling is fixed to the adjusting shaft, both rotationally and axially so as not to be slidable in the direction away from the thrust spindle, and wherein the remainder of the adjusting drive mechanism is axially slidable in a direction away from the thrust spindle against an elastic restoring force.

2. An adjusting mechanism according to claim 1 wherein said adjusting drive mechanism is activated by the application shaft after the application shaft rotates beyond a predetermined rotational amount.

3. An adjusting mechanism according to claim 2 wherein the connection between the application shaft and the adjusting drive mechanism comprises a pin-and-slot connection, said slot defined by an extension of said application shaft and wherein the pin is part of said adjusting drive mechanism and extends within said slot and is moved by said extension after said application shaft rotates beyond said predetermined rotational amount.

4. An adjusting mechanism according to claim 3, wherein said slot is open in a direction generally toward the side of the application shaft directed away from the brake disc.

5. An adjusting mechanism according to claim 1 further comprising a means for maintaining a free space for the axial sliding of the adjusting drive mechanism.

6. An adjusting mechanism according to claim 5 wherein said means for maintaining a free space comprises at least two retaining rings.

7. An adjusting mechanism according to claim 1, wherein said adjusting drive mechanism is disposed on the side of the application shaft directed away from the brake disc.

8. An adjusting mechanism according to claim 7, wherein said means for maintaining a free space comprises a spacing bushing.

9. An adjusting mechanism according to claim 1, wherein said force-dependent coupling is a toothed locking mechanism, and wherein said remainder of the adjusting drive mechanism is slidable axially in the direction away from the thrust spindle over a distance at least equal to that necessary for overrunning the toothed locking mechanism.

10. An adjusting mechanism according to claim 1, wherein said force-dependent coupling is a spring-loaded frictional locking mechanism.

11. An adjusting mechanism for a disc brake, particularly a sliding-caliper disc brake having a brake disc oriented in a particular plane, including a brake application mechanism including a brake thrust head, a thrust spindle engaging said thrust head, a thrust piece adjustably connected with said thrust spindle, and brake application means for applying force to said thrust piece to move the brake thrust head in a brake-applying direction, said brake application means including an application shaft engaging said thrust piece and rotatable about an axis parallel to the plane of the brake disc, wherein the adjusting mechanism comprises an adjusting shaft connected to said thrust spindle for rotating said thrust spindle to adjust the position of said thrust spindle with respect to said thrust piece, said adjusting shaft including a first coupling portion fixed thereto, an adjusting drive means connected with said brake application means, and including force-dependent coupling means for coupling said adjusting drive means with said first coupling portion fixed to said adjusting shaft, said force-dependent coupling means including a second coupling portion fixed to said adjusting drive means and engaging with said first coupling portion, compression means for biassing said adjusting drive means toward said adjusting shaft through said force-dependent coupling means, and means for permitting said adjusting drive means to slide axially in a direction away from said thrust spindle.

12. The adjusting mechanism of claim 11 wherein said adjusting drive means includes a rotatable portion rotatably driven by said brake application means, said rotatable portion including said second coupling portion that interengages with said first coupling portion, said second coupling portion rotating said first coupling portion and, in turn, rotating said adjusting shaft.

13. The adjusting mechanism of claim 12 where said first and second coupling portions each include locking teeth.

14. The adjusting mechanism of claim 13 wherein the adjusting drive means slides axially when the locking teeth of said second coupling means overruns the locking teeth of said first coupling means.

15. The adjusting mechanism of claim 11 wherein said first and second coupling portions comprise a toothed locking interengagement.

* * * * *